INVENTOR.
ARTHUR S. NICHOLAS
BY
ATTORNEYS

Dec. 13, 1966  A. S. NICHOLAS  3,291,526
GUARD FOR VEHICLE SAFETY BELTS
Filed Oct. 1, 1964  2 Sheets-Sheet 2

INVENTOR.
ARTHUR S. NICHOLAS
BY
ATTORNEYS

United States Patent Office 3,291,526
Patented Dec. 13, 1966

3,291,526
GUARD FOR VEHICLE SAFETY BELTS
Arthur S. Nicholas, East Grand Rapids, Mich., assignor to Leon Chemical Industries, Inc., Grand Rapids, Mich., a corporation of Michigan
Filed Oct. 1, 1964, Ser. No. 400,647
1 Claim. (Cl. 297—388)

This invention relates to housings to facilitate the storing of vehicle safety belts on retractor mechanisms of the type now being used with these belts. This invention deals with housings for safety belts in situations in which the retractor is both stationary and recessed and the belt is simply withdrawn from the retractor or permitted to rewind on the retractor. The purpose of this invention is to provide a protective housing and an appropriate guide for the belt as it is extended and retracted. In guiding the belt, it prevents the belt from entering the retractor while twisted or misaligned, eliminating the problem of malfunction of the retractor.

In addition to this, it provides a protective covering closing the top of the recess in which the retractor is located. It also protects the adjacent end of the retracted belt. This protects the webbing of the belt and the retractor from injury due to physical contact with other objects and it shields them from such harmful substances as water, calcium chloride, sodium chloride, oil, grease and other forms of dirt. Also, it seals the retractor chamber against entry by dust and grit. If the retractor and the belt are not so protected, they rapidly become dirty, unsightly and ultimately unusable. It has been found that even relatively small quantities of dust or grit quickly render most retractor mechanisms inoperative. Water and corrosive chemical substances rapidly deteriorate the stitching at the attachments of the webbing to the anchor and the buckle. At best, this is normally the weak point of the belt. Any weakening at this point is, therefore, a serious matter. This invention eliminates this problem. This is in addition to the fact that the corrosive chemicals which may otherwise make contact with the retractor can quickly render it inoperative. This protective feature is an important and substantial contribution to vehicle belt safety.

Further, it covers the recess, preventing it from becoming an unsightly catch-all for paper, small objects and other trash which collects on the floor of a vehicle. These objects can become enmeshed in the retractor, resulting in malfunction.

This invention also acts as a silencer. This is becoming more important as self-locking and ratchet type retractors are being more widely adopted. These mechanisms are frequently noisy. This housing materially reduces this problem. In those constructions having a long neck or web guide portion, the housing contains a substantial length of webbing which never has to be wound onto the retractor. This webbing must be provided to accommodate the height of the seat from the vehicle floor. However, by storing it in the guide portion of the housing rather than on the retractor, the size and bulk of the retractor can be substantially reduced. This is important in many vehicles where space to locate the retractor is minimal.

The invention also holds the retractor and the belt in a convenient position for the user. Thus, it encourages the use of the belt, and to this extent, promotes safety.

It conceals the retractor mechanism in the recess. Also, it discourages people, particularly children, from tampering with the retractor structure. This is important in reducing instances of malfunction.

It provides a cover for the retractor recess and the end of the retracted safety belt which is durable, will not injure personnel and will not mark or injure clothing. At the same time, it is relatively inexpensive and by reason of the fact that it greatly increases the life of both the retractor and the belt, it effects in the long run a considerable savings in over-all costs. It also improves the appearance of the vehicle.

These and other objects and purposes of this invention will be understood by those acquainted with the engineering and installation of safety belts upon reading the following specification and the drawings.

In executing the invention, the retractor is recessed in the floor or sill of the vehicle. It is secured by suitable means to a fixed structure of the vehicle. The housing or cover has a bottom flange which extends outwardly entirely covering and sealing the recess in which the retractor is mounted. The cover has an upwardly extending portion providing a guide for the web of the safety belt. The size of the inner opening or throat through this portion is only enough to permit the web of the belt to slide through it. The throat guides the belt and positions it properly as the belt is rewound on the retractor. This portion also provides a stop and seat for the buckle at the end of the belt when the belt is fully retracted and in storage. The housing is held against travel with the belt, but does not itself carry any of the operating load imposed upon the belt since this is transmitted directly from the belt to the retractor mechanism and by the retractor mechanism to the anchor means securing the retractor to the vehicle structure.

While the housing may be made of any suitable material, an example of a satsifactory material is a scuff resistant, synthetic, resinous material. This material may be rigid or it may have a limited degree of flexibility, i.e., with sufficient rigidity to support both its own weight and the weight of the webbing and buckle. When such a material is used, it should have a significant degree of plastic memory.

Figure 1:
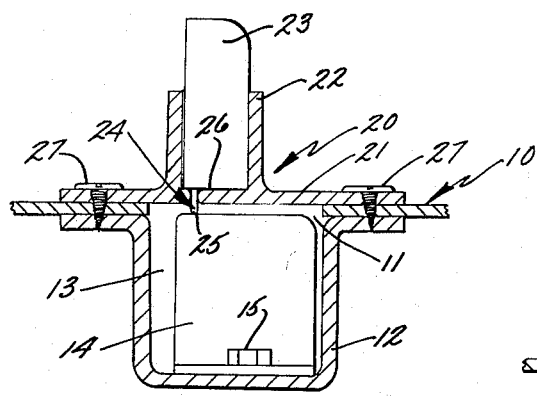
FIG. 1 is a sectional, elevation view of this invention.

Referring specifically to the drawings and to FIG. 1, the numeral 10 indicates a body panel through which has been cut or otherwise formed an opening 11. Below this opening 11 is an enclosure member 12. In its preferred embodiment, the enclosure member 12 encases the retractor, sealing the recess except for the top opening 11. The enclosure member at its upper end is secured to the panel 10 by any suitable means and has a central downwardly depending portion forming a recessed well 13. The well 13 is open at its upper end through the opening 11.

Mounted to this well is a retractor mechanism 14. The retractor mechanism is characterized by the fact that it has a spring or similar device to apply tension to the belt to wind it on the mechanism. The retractor mechanism may be secured to the enclosure member 12 an any suitable manner such as by the bolts 15. However, if the retractor has a different type of structure, it may be mounted on the side of the enclosure member or it may even be mounted by separate and independent bracket means directly to the panel 10. The only important limitation is that the retractor be positively mounted to a structure sufficient to withstand the sudden, high loadings which may be imposed upon the retractor in the event of an emergency.

The specific structure of the retractor is neither illustrated nor described inasmuch as it may take a number of forms, all of which are conventional and form no part of this invention except to the extent that the retractor constitutes a portion of the over-all combination which this invention creates. Accordingly, detailed illustration and description of the retractor mechanism itself is not considered necessary.

Figure 6:
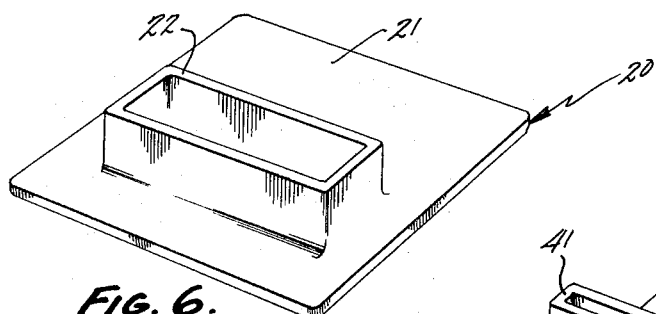
FIG. 6 is an oblique view of the form of the invention illustrated in FIG. 1.
Figure 7:
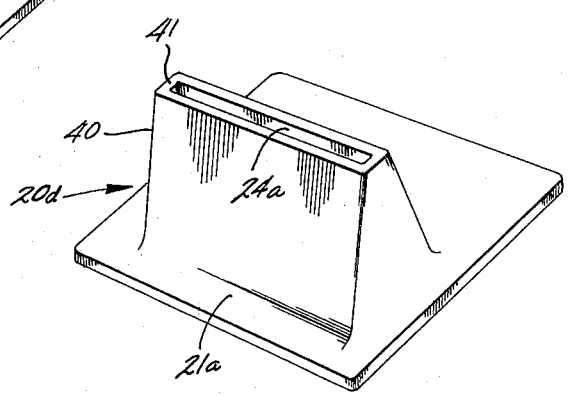
FIG. 7 is an oblique view of the form of this invention illustrated in FIG. 4.
Figure 8:
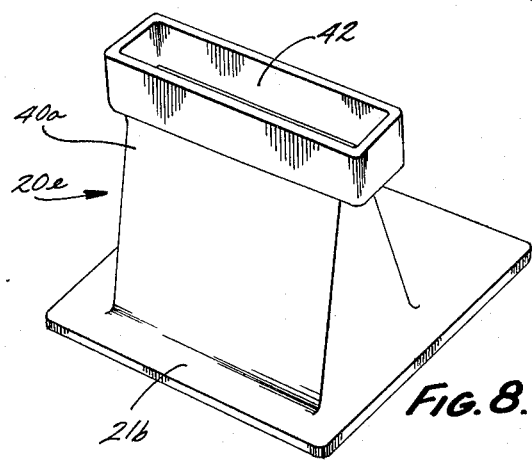
FIG. 8 is an oblique view of the form of this invention shown in FIG. 5.

Seated over the opening 11 is a housing 20. As seen in FIGS. 1 and 6, the housing 20 at its lower end has an outwardly extending flange 21 of a size that it overlaps the panel 10 on all sides of the opening 11. As such, it completely closes, seals and conceals the presence of the opening 11. Projecting upwardly from the flange 21 is a rectangular cup 22. In the particular form shown, the cup 22 is offset toward one side of the flange or cover 21 to permit it to line up with one side of the retractor 14. The size of the cup 22 is such that it will receive the latch portion 23 of a safety belt with a portion of the latch seating within and housed by the cup. Its depth is such as to positively hold the latch or buckle, but leaving enough of it exposed to be readily grasped by a person when he wishes to withdraw it from the cup for use.

The bottom of the cup is substantially closed except for a small throat-like opening 24 through which the web 25 of the safety belt passes from the buckle 23 to the retractor 14. The size of the throat 24 is such as to restrict the web to a predetermined path aligned with the retractor mechanism and to keep the web from passing to the retractor while folded, twisted or otherwise entangled. The bottom of the cup 22 is in effect formed by an extension of the flange 21, with that portion of it extending into the cup forming a stop 26 against which the buckle rests under the bias applied by the retractor 14.

Figure 3:
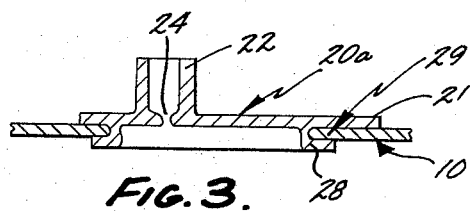
FIG. 3 is a sectional, elevation view of a further modified form of this invention.

The housing 20 may be secured by any suitable means such as by the screws 27. These, however, are only one possibility for anchoring the housing as is suggested in FIG. 3 in which the housing 20a is equipped with a depending flange structure 28, having outwardly extending fingers forming a channel 29 for receiving the edges of the panel 10. Whatever securement means is used should be adequate to hold the housing down against the surface of the panel 10 to effect a seal against the entry of foreign substances into the recess 11.

The rim 28 may either entirely surround the opening 11, or it may surround it on only two or three sides. The finger portion seating under the panel 10 secures the housing 20a to the vehicle. Other means may be utilized to the same end. The rim 28 is not structural in the sense of being subjected to high loadings, and even if it did become displaced under emergency conditions, it would not affect the proper functioning of the safety belt.

Figure 2:
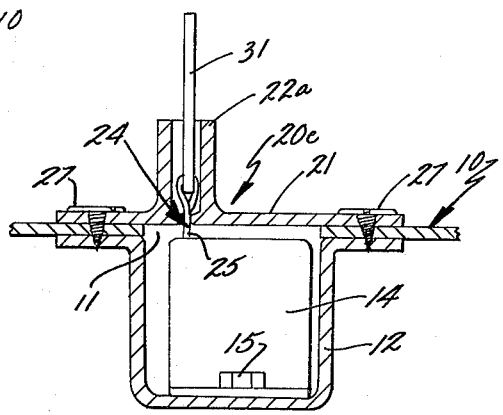
FIG. 2 is a sectional, elevation view of a slightly modified form of this invention.

FIG. 2 illustrates a modification of the housing of FIG. 1. The housing 20c is identical to the housing 20 except that the cup or pocket 22a is narrower because it is designed to receive the keeper plate portion 31 of the safety belt buckle. Since this is normally a flat plate, the pocket 22a should be narrower in order to properly hold it in an upright and convenient position. Other than this, the housing is identical, both in structure and in function.

Figure 4:
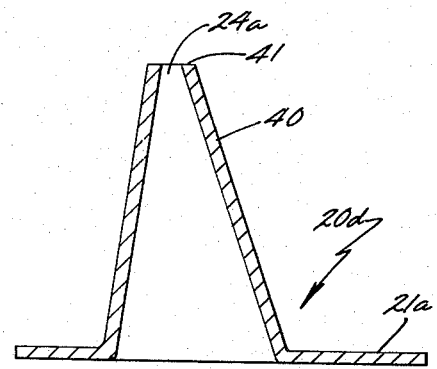
FIG. 4 is a sectional, elevation view of an additional modified form of this invention.

FIG. 4 illustrates a further embodiment of this invention in which the housing 20d has a long upwardly projecting neck portion 40, the lower end of which is surrounded by a flange 21a. The size, purpose and function of the flange 21a is the same as the flange 21. The neck portion 40 is hollow and its walls converge upwardly to a narrow throat 24a at the upper end. This throat serves the same purpose as the throat 24 in guiding and properly aligning the web of the safety belt. The upper end of the neck portion 40 forms a stop 41 against which either a keeper plate such as the keeper plate 31 or a latch such as the buckle 23 comes to rest and is held against further retraction despite the bias of the retractor.

The purpose of providing the long neck portion 40 is to permit the use of this invention in those circumstances where the height of the top of the seat is substantially above the panel 10, and thus, the end of the belt for convenience should be retained in an elevated position. In other words, in addition to its function of sealing, covering and concealing the retractor recess, protecting the end of the belt, and protecting the retractor mechanism itself, this housing also provides a positive support and locator for the buckle mechanism at a point which is most convenient to the vehicle rider.

Figure 5:
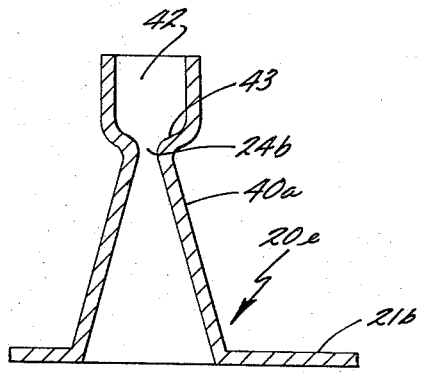
FIG. 5 is a sectional, elevation view of a modified construction of the form of this invention illustrated in FIG. 4.

FIG. 5 illustrates basically the same housing as that shown in FIG. 4. The housing 20e has a surrounding flange 21b, an upstanding neck portion 20a, which at its upper end, converges to form a restricted throat 24b. However, above the throat 24b, the walls of the housing flare outwardly and then extend upwardly to form a pocket 42. The pocket 42 serves the same purpose as the pocket 22, that is to receive, hold and limit the downward or retracting movement of a buckle 23. It provides a more desirable structure than the housing 20d inasmuch as the walls of the pocket 42 give added and positive support to the buckle and partially conceal it. It will be seen that the bottom walls or floor 43 of the pocket 42 provide a positive stop for the buckle 23. It will be recognized that the pocket 42 may be fabricated to be narrower and conform more closely to the dimensions of the pocket 22a in the event that the housing is to be used with the keeper plate end of the safety belt.

Figure 9:
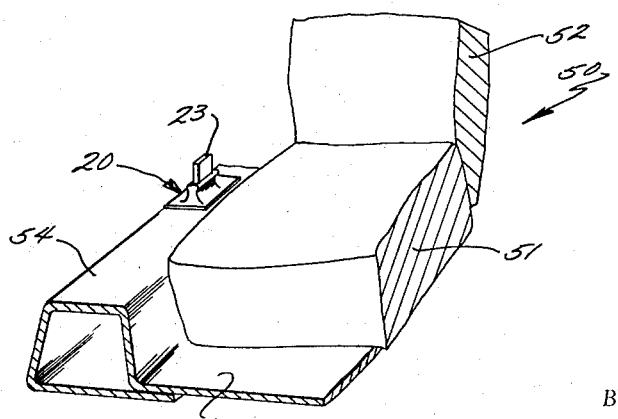
FIG. 9 is a schematic view of a vehicle equipped with this invention.

FIG. 9 illustrates a typical example of the use and installation of this invention. In this particular environment, the vehicle has a seat 50 having a seat cushion 51 and a back cushion 52. The seat is mounted by any suitable means on a fixed portion of the vehicle such as the floor panel 53. Beside the seat, the floor panel of the vehicle is formed into an upstanding sill structure 54, projecting substantially to the height of the seat. Thus, the seat is deeply recessed within the vehicle. The opening 11 is provided in the top wall of the sill 54 and is concealed and enclosed by one of the housings 20. It will be noted that the buckle 23 is thus held in a convenient position for the vehicle rider. Further, it is held where it cannot fall out of the car and will not interfere with the rider's entering or leaving the vehicle. It provides a neat and attractive accessory to the vehicle, and completely protects the safety belt structure. At the same time, the entire retractor mechanism and all of the web of the belt when retracted are entirely concealed, and both are protected from injury and the adverse effect of substances which might cause their deterioration.

Various materials may be used for the housing. In one form, the housing is molded of a material of sufficient stiffness that it can support its own weight, and also that of the buckle. For this type of housing, a preferred material is a semi-rigid synthetic resin as for example, a molded vinyl resin having a reasonably heavy wall thickness. This type of material is desirable because it can be provided with a neat and attractive appearance. It can be made in any color to blend with the decor of the vehicle's interior. It is rigid enough to support the buckle and the retractor, yet has sufficient give or yield that, should it be struck a sharp blow such as would result from a kick, it will flex and return to its original shape without mark or injury. The vinyl resins are highly resistant to scuffing, moisture, lubricants and the corrosive chemicals frequently encountered in vehicle use. Thus, it is durable and will retain its attractive appearance over a substantial life span. It will also be recognized that there are synthetic resinous materials other than vinyl which will fulfill these specifications.

In other types of installations, a completely rigid material may be used. When this type of material is used, the housing may be cast or injection molded. The materials selected should have the characteristics of high impact and scuff resistance, as well as being impervious or relatively impervious to the chemicals normally encountered in vehicle use. It should also be capable of being molded in colors which will blend with vehicle decor. Examples of suitable materials are polyethylene and a copolymer commonly referred to as ABS (acylonitrile butadiene styrene). There are even situations in which the housing may be fabricated of metal, such for example as cast aluminum.

Irrespective of the material used for fabricating the housing or the particular form of the housing selected, this invention materially increases the durability and safety of the belts. It also encourages their use and as such constitutes an important contribution to vehicle safety.

It will be understood that throughout this description and in the following claim, unless specifically designed otherwise, the term "buckle" is intended to apply to either part of the conventional two piece vehicle safety belt buckle system. Thus, the term embraces either the latch or the keeper portions of the buckle.

Having described my invention in its preferred embodiment and several modifications of this preferred embodiment, that which I claim to be patentable is defined in the hereinafter appended claim.

I claim:

In combination with a vehicle having a structural body panel and a well in said panel, a vehicle safety belt having a web, a buckle and a retractor therefor, an opening in the upper surface of said panel; said retractor mounted in said well below said opening and aligned therewith; said web extending upwardly therefrom; a web guide mounted over said opening, said web guide having an upwardly extending tubular central portion defining a web channel; the walls of said web channel forming a constricted throat therein of a size suitable to slidably pass said web and position it in a predetermined path; the upper end of said central portion forming a stop surface, said web channel at said upper end being smaller than said buckle and said stop surface engaging said buckle to limit its downward travel under the bias of said retractor; the walls of said web channel flaring outwardly to form a buckle receiving pocket with said stop surface at the bottom thereof; the lower end of said web guide overlapping the edges of said opening for closing and concealing the same; said lower end also forming a seal with said edges; means for securing said web guide to said panel; said web guide being a single integral body of a material having sufficient rigidity to support the weight of the web and buckle together with the downward pull exerted by the retractor on the web.

References Cited by the Examiner

UNITED STATES PATENTS

| | | | |
|---|---|---|---|
| 2,071,903 | 2/1937 | Shively | 297—388 |
| 2,488,858 | 11/1949 | Franz | 297—388 |
| 2,830,655 | 4/1958 | Lalande | 297—388 |
| 3,125,374 | 3/1964 | Bissell | 297—388 |
| 3,126,227 | 3/1964 | Bollinger | 297—385 |

References Cited by the Applicant

UNITED STATES PATENTS

| | | |
|---|---|---|
| 2,945,275 | 7/1960 | Almeter. |
| 2,964,100 | 12/1960 | McCall. |
| 3,046,056 | 7/1962 | Greene. |

FRANK B. SHERRY, *Primary Examiner.*

J. S. PETRIE, *Assistant Examiner.*